J. J. DA SILVEIRA E PAULO.
MACHINERY FOR DRYING COCOA.
APPLICATION FILED MAR. 30, 1908.
921,631.
Patented May 11, 1909.
3 SHEETS—SHEET 2.
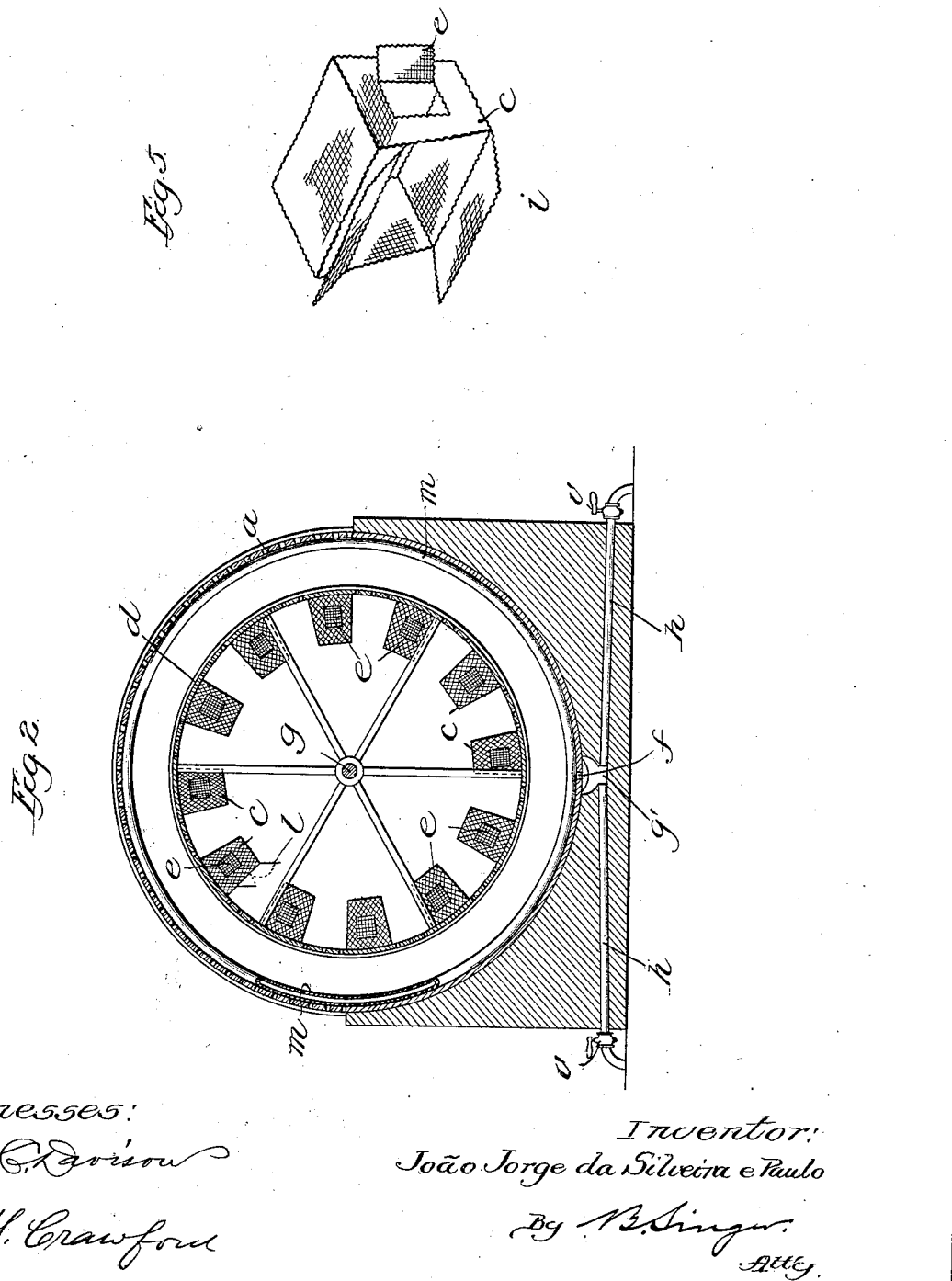
Witnesses:
Inventor:
João Jorge da Silveira e Paulo J. J. DA SILVEIRA E PAULO.
MACHINERY FOR DRYING COCOA.
APPLICATION FILED MAR. 30, 1908.
921,631.
Patented May 11, 1909.
3 SHEETS—SHEET 3.
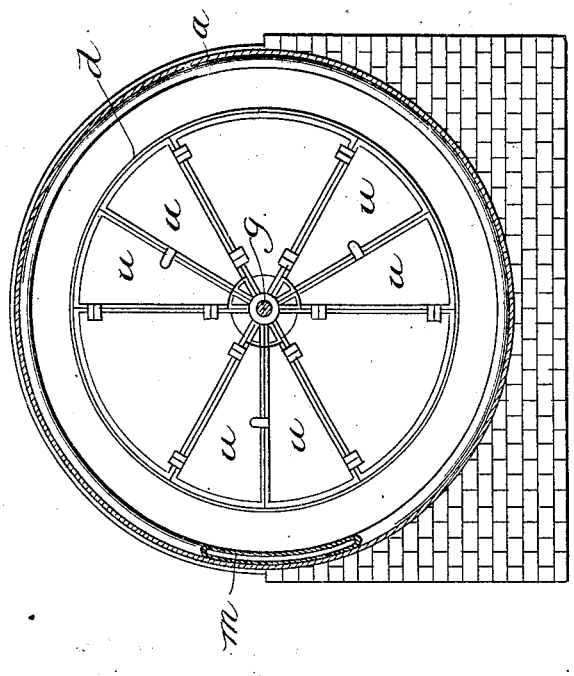
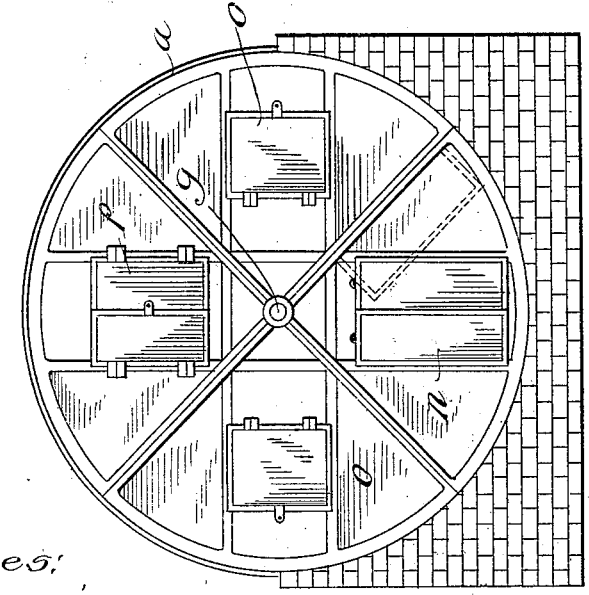

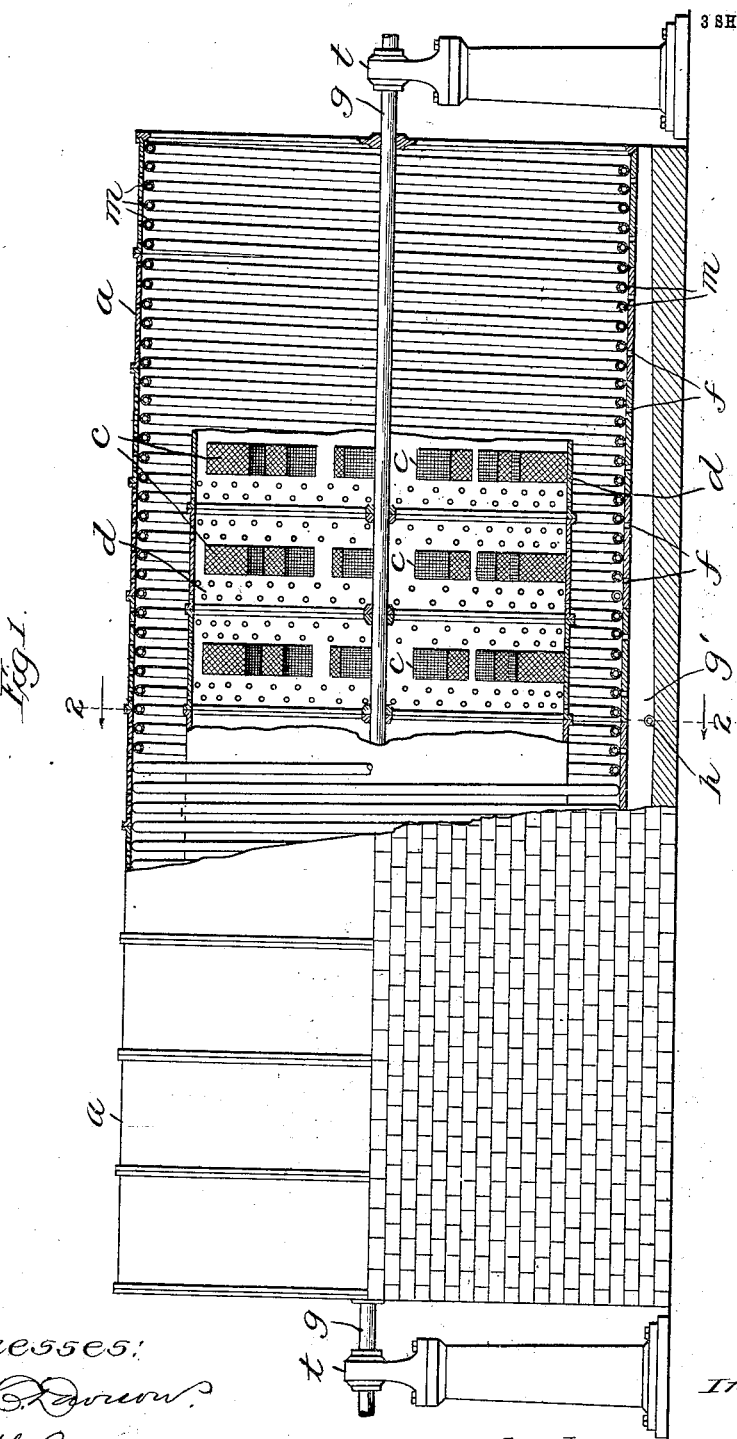

UNITED STATES PATENT OFFICE.

JOÃO JORGE DA SILVEIRA E PAULO, OF LISBON, PORTUGAL.

MACHINERY FOR DRYING COCOA.

No. 921,631.  Specification of Letters Patent.  Patented May 11, 1909.

Application filed March 30, 1908. Serial No. 424,217.

*To all whom it may concern:*

Be it known that I, JOÃO JORGE DA SILVEIRA E PAULO, a subject of the King of Portugal, and resident of Lisbon, Portugal, have invented a certain new and useful Improvement in Machines for Drying Cocoa, of which the following is full, clear, and exact description.

This invention relates to improvements in machines for drying cocoa and has for its object the provision of a machine in which material of this character can be effectively and quickly dried and readily inspected by the operator.

The invention will be more fully described in connection with the accompanying drawings and will be more particularly pointed out and ascertained in and by the appended claim.

In the drawings:—Figure 1 is a view partly in elevation and partly in section illustrating a machine embodying the main features of my invention. Fig. 2 is a transverse sectional view thereof. Fig. 3 is an end elevation thereof. Fig. 4 is an end view with parts omitted to show the internal mechanism. Fig. 5 is a detail perspective view of one of the compartments for containing the cocoa.

Like characters of reference designate similar parts throughout the different figures of the drawings.

As shown in the drawings $d$ designates a cylinder, which may if desired be made up of a plurality of sections, and which is secured to a shaft $g$ mounted in suitable bearings $t$. The cylinder $d$ may be rotated by the application of power to the shaft $g$ in any desired manner not shown. The cylinder $d$ is composed of a metallic frame provided with a peripheral wall of foraminated material so as to permit free circulation of the drying medium. A plurality of longitudinally disposed compartments $c$ are secured in the side of the cylinder $d$ in a manner to project radially inwardly from the cylindrical wall. Said compartments are arranged in parallel relation and are spaced apart from each other a sufficient distance to permit passage of the operator when charging and removing the cocoa from the compartments. In order that cocoa may be effectively subjected to the drying action of whatever medium is used said compartments are formed of wire net or suitable foraminated material and are provided with charging doors $i$ and inspection doors $e$. It will be obvious that the rotation of the cylinder $d$ will agitate or displace the contents of the compartments $c$ in an effective manner so that no supplemental or auxiliary stirring or agitating means will be necessary.

A casing $a$ is shown surrounding the cylinder $d$ for the purpose of inclosing the same and retaining the drying medium so that the same will act upon the contents of the compartments $c$. Means preferably in the form of a coil or pipe $m$ is disposed within the casing $a$ and mainly connected with a source of supply of steam (not shown) for the purpose of heating the air within the casing. Any suitable form of discharge (not shown) may be provided and the source of supply of discharge may be regulated by valves in any well known manner.

Drainage for condensed vapor may be provided by providing the casing $a$ with a plurality of openings $f$ discharging into suitable outlets hereinafter described. The casing $a$ is provided with closable openings $o$, $p$ and $n$ for the purpose of admitting air when the drying operation has been completed and also for the purpose of changing, or supplying fresh air, to the casing during the drying operation.

The cylinder $d$ may be provided with doors $u$ arranged abreast of the compartments $c$, and the spaces therebetween, so that access may be had to any of the several compartments.

I desirably mount the casing $a$ in a longitudinally concave support of masonry or other suitable material and in the lower portion thereof longitudinally disposed drainage grooves are formed and as shown said grooves are made relatively deeper from the ends of the supports $s$. Transversely disposed tubes $h$ communicate with the grooves $g$ and may conveniently be opened and closed by taps $v$.

I claim:—

A cocoa drying device comprising in combination, a concave masonry provided with a longitudinal drainage groove gradually deepening toward the center of said support, transverse drainage tubes communicating with said groove to discharge the contents therefrom, a cylindrical casing seated in said support and provided with discharge openings delivering to said groove, air doors for said casing, a heating coil for said casing, an operating shaft extending through said casing, a foraminated cylinder mounted on and rotated by said shaft and located within said casing, said casing being provided with a plurality of radially disposed inwardly projecting foraminated compartments provided with doors opening into said cylinder, and doors for said cylinder adjacent said casing doors.

JOÃO JORGE DA SILVEIRA E PAULO.

Witnesses:
MANUEL CARREIRO IONEGO,
ROBERTO ETINO.